United States Patent [19] [11] Patent Number: 4,580,168
Levine [45] Date of Patent: Apr. 1, 1986

[54] CHARGE-STORAGE-WELL DARK CURRENT ACCUMULATOR WITH CCD CIRCUITRY

[75] Inventor: Peter A. Levine, Mercer County, N.J.

[73] Assignee: RCA Corporation, Princeton, N.J.

[21] Appl. No.: 687,368

[22] Filed: Dec. 28, 1984

Related U.S. Application Data

[63] Continuation-in-part of Ser. No. 382,422, May 27, 1982, Pat. No. 4,496,982.

[51] Int. Cl.$^4$ ............................................... H04N 5/34
[52] U.S. Cl. ..................................... 358/213; 358/221
[58] Field of Search .............. 358/213, 212, 163, 221, 358/44, 48; 357/24 LR, 24; 250/578

[56] References Cited

U.S. PATENT DOCUMENTS

| 4,435,730 | 3/1984 | Bendell et al. | 358/213 |
| 4,486,778 | 12/1984 | Risch et al. | 358/111 |
| 4,496,982 | 1/1985 | Levine | 358/221 |
| 4,525,743 | 6/1985 | Wood, Jr. et al. | 358/213 |

Primary Examiner—Gene Z. Rubinson
Assistant Examiner—Robert G. Lev
Attorney, Agent, or Firm—Joseph S. Tripoli; George E. Haas; Allen L. Limberg

[57] ABSTRACT

A CCD imager is disposed on the same semiconductor substrate as a charge storage well used to accumulate dark current charge sensed to generate a dark-current-responsive output signal. This dark-current-responsive output signal is used in suppressing dark current field shading or in controlling the cooling of the semiconductor substrate or both, by way of examples.

7 Claims, 7 Drawing Figures

4,580,168

CHARGE-STORAGE-WELL DARK CURRENT ACCUMULATOR WITH CCD CIRCUITRY

This is a continuation-in-part of U.S. patent application Ser. No. 382,422, filed May 27, 1982 now U.S. Pat. No. 4,496,982 1/29/85 by P. A. Levine, entitled "COMPENSATION AGAINST FIELD SHADING IN VIDEO FROM FIELD-TRANSFER CCD IMAGERS", assigned to RCA Corporation, allowed July 2, 1984, and included herein by reference.

The invention relates to a dark-current sensor integrated on the same semiconductor substrate as a charge-coupled-device, for generating dark-current reference signals. Such signals are used for compensation against dark-current field shading in a CCD imager of field transfer type or for controlling the cooling of the semiconductor substrate, for example.

BACKGROUND OF THE INVENTION

With increase in the operating temperature of a CCD imager, the dark current generated in the semiconductive substrate by thermal excitation increases. Each charge packet is descriptive of the energy of an image element. During its passage across the substrate through successively induced potential energy wells, the charge packet is augmented by dark current charge collection in those wells. So when these charge packets are finally sensed, dark-current components undesirably accompany the photoconversion response components. These dark-current components can be reduced in the imager output signal by cooling the imager or by subtracting away the dark-current components. If the imager cooling is regulated, or if dark current components are to be suppressed by a subtracting away process, it is necessary to derive a temperature-dependent or dark-current-dependent signal.

To provide best tracking between this signal and the dark current components accompanying photoresponse components, it is desirable to develop this signal as a dark-current dependent signal, deriving it from collected dark current. The collection of dark current is preferably from a significantly large portion of the semiconductor die so that the integrated dark current is large compared to its accompanying noise. This noise arises because collection of dark current is a statistical, quantized process. E.g., there can be a collection of remnant charge transferred out of the field storage (B) register of a CCD image of field transfer type during field transfer times and transmitted through the output line (C) register to the output electrometer stage. But while this general scheme works for CCD imagers of field transfer or interline transfer type, this does not work for other types of CCD imagers, such as the line transfer type. Furthermore, there is usually some degree of light leakage into the field storage register which generates spurious photoresponse that can undesirably augment low-level dark-current components. Low-level dark-currents can also be undesirably augmented by noise from the electrometer.

A potential energy well can be induced in the surface of a portion of the semiconductor die shielded from irradiation, which well is relatively large in area compared to the potential wells in the CCD registers of the imager itself. Dark current collected in this well can be sensed with an electrometer to generate a dark-current dependent voltage that is relatively noise-free. This permits dark-current field shading cancellation to be carried out without appreciably reducing the signal-to-noise ratio of the output video signal. Since the dark-current-dependent signals are slow-changing, the field effect transistor used in a floating diffusion electrometer output stage can be operated at lowered current levels to reduce heating. Furthermore, the electrometer transistor can be made a small-area device which reduces gate capacitance and so in accordance with Coulomb's Law increases electrometer sensitivity to charge.

SUMMARY OF THE INVENTION

The invention is embodied in a CCD imager combined on the same semiconductor die with a dark current sensor. The dark current sensor uses a relatively-large-area potential energy well, induced in a portion of the semiconductor die masked from irradiation, to collect dark current charge. The collected charge is sensed to generate a dark current responsive voltage signal with no accompanying response to the radiant energy image illuminating the CCD imager.

DETAILED DESCRIPTION

Figure 1:
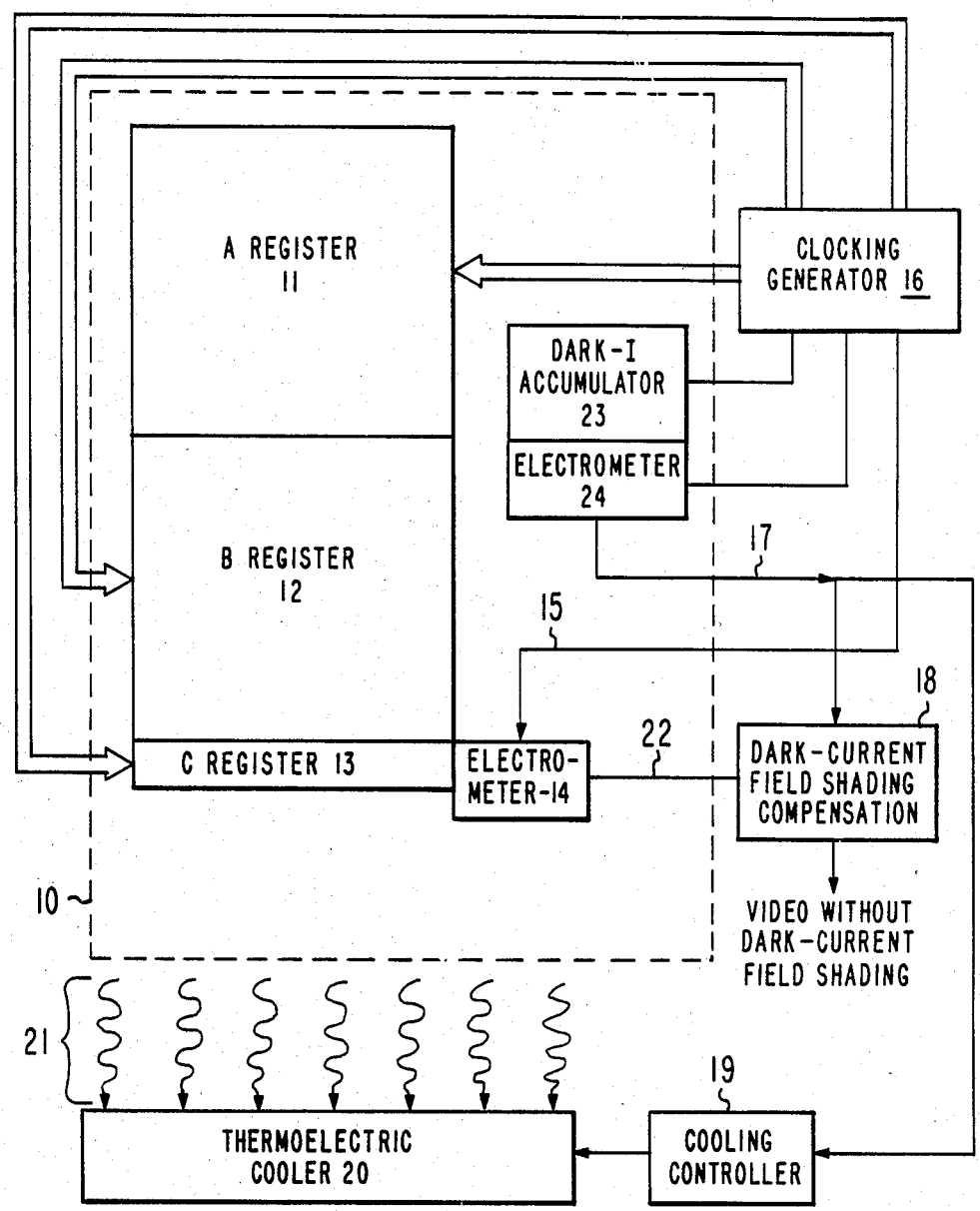
FIG. 1 is a block diagram of a CCD imager incorporating a dark current sensor of the type embodying the invention.

FIG. 1 shows a CCD imager 10 of field transfer type. Such an imager has an image, or A, register 11 comprising a plurality of parallelled charge transfer channels illuminated by a radiant energy image. During field scan times in the video signal output of a field transfer imager, the gate electrodes overlying the charge transfer channels receive static clocking signal voltages that define storage well locations at which charge packets are accumulated. The charge packets are accumulated from the charge carriers generated by photoconversion of the radiant energy image in the charge transfer channels and the underlying bulk semiconductor. The field transfer imager 10 also has a temporary field storage, or B, register 12 comprising a plurality of charge transfer channels shielded from illumination and arranged with their input ports connected to the output ports of the charge transfer channels in A register 11. During a portion of field retrace times in the video signal output of the imager, A register 11 and B register receive dynamic clocking signals synchronized in phasing to transfer the charge packets accumulated in positions in A register 11 into corresponding positions in B register 12. During line retrace intervals in the subsequent field scan B register 12 receives dynamic clocking signals that advance the charge packets therein one position per line retrace. A successive line of charge packets is transferred out of the output ports of the charge transfer channels in B register 12 each line retrace interval. These charge packets are loaded in parallel into respective charge transfer stages in the charge transfer channel of an output line, or C, register 13. During line trace intervals C register 13 receives dynamic clocking signals operating it as a shift register to supply these charge packets serially at pixel scan rate to a charge sensing output stage, such as electrometer 14, for conversion to output video voltage samples.

Electrometer 14, for example, may use a floating diffusion located in the output end of the C register 13, periodically reset to a prescribed reset drain potential and connected to the gate electrode of an insulated gate field effect transistor. The field effect transistor operates as a common-drain or common-source amplifier to supply output video voltage samples responsive to the voltages electrostatically induced on its gate electrode by charge packets under the floating diffusion. Resetting of the floating diffusion is carried forward by field effect transistor action in the output end of C register 13 itself, responsive to reset pulses applied via connection 15 to a reset gate interposed between the floating diffusion and a reset drain diffusion.

CCD imager 10 as thusfar described is a conventional CCD imager of field transfer type. A clocking generator 16 supplies A register 11, B register 12 and C register 13 clocking signals and electrometer 14 reset signal to implement the operation of imager 10 as described above. As described in U.S. patent application Ser. No. 382,422, the output signal of CCD imager 10 is supplied to a dark-current field shading compensation circuit 18 to have field shading attributable to dark current accumulation in B register 12 suppressed therefrom. Suppression is done in response to dark current samples supplied from imager 10 via a connection 17. The dark current samples supplied via connection 17 are also applied to a cooling controller 19, which controls the supply of power to a thermoelectric cooler 20. Thermoelectric cooler 20 withdraws heat 21 from imager 10 in an amount controlled by the power supplied to it, to maintain the average amplitude of the dark currents generated in imager 10 below a prescribed threshold value.

What is of primary concern with regard to the invention is the apparatus within CCD imager 10 for generating the dark current samples supplied via connection 17. This apparatus comprises a dark current accumulator 23 and an electrometer 24 for recurrently converting the accumulated dark current to a dark current voltage sample supplied through connection 17. Dark current accumulator 23 essentially consists of a large area storage gate under which dark current charge is collected and a transfer gate. It is preferable to locate the large area gate electrode remote from the C register, which because of its relatively high rate of clocking is a significant localized heating source. But, locating the large area gate electrode close to electrometer 14 and clocking the transfer gate in proper timing with C register 13 allows the use of just the single electrometer 14 in time-division-multiplex, in a variant of the invention dispensing with the need for electrometer 24. This variant requires demultiplexing the shared electrometer output signal so samples only of dark current can be separated from video samples with picture content.

Figure 2:
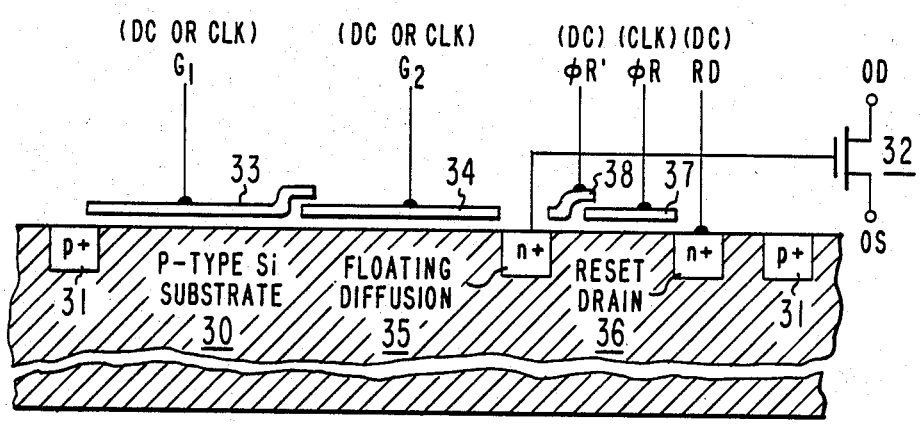
FIG. 2 is a profile view of the dark current sensor.
Figure 3:
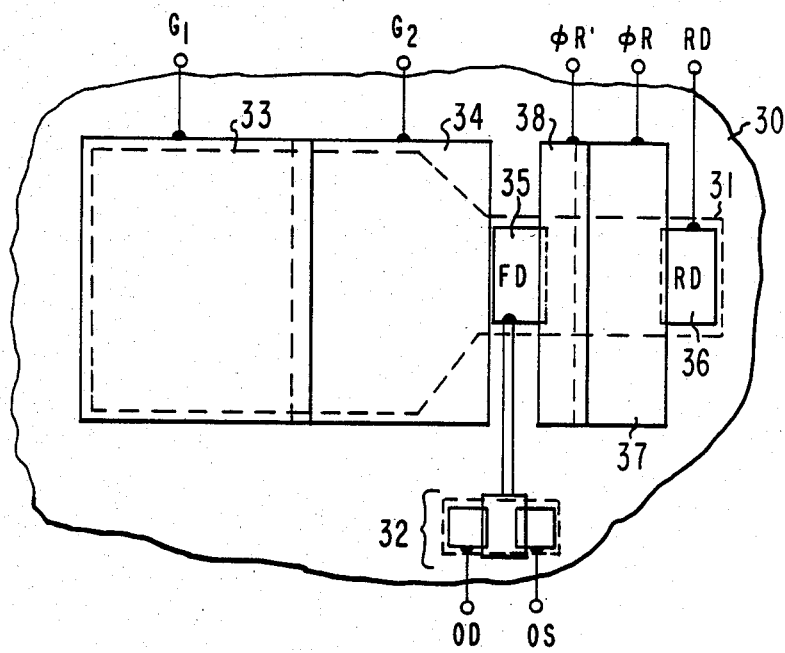
FIG. 3 is a plan view of the dark current sensor.

FIGS. 2 and 3 are profile cross-section and plan view of the dark current accumulator 23 and its electrometer. These views are stylized per convention. E.g., vertical dimensions are greatly expanded relative to horizontal dimensions in the profile cross-section of FIG. 2. The substrate 30, or bulk, of semiconductive material is shown as being p-type silicon; and a p+ channel stop 31 surrounds the dark current sensor exclusive of the electrometer field effect transistor 32. The now-customary n- type silicon top layer for burying the charge transfer channel defined by channel stop 31 is omitted from FIGS. 2 and 3 for clarity. A gate electrode 33 has a storage well induced in the portion of p substrate 30 thereunder, responsive to $G_1$ potential applied thereto. The area of gate electrode 33 over the charge transfer channel defined by channel stop 31 is preferably of a size to make the storage well induced thereunder large compared to the storage wells induced in the CCD imager per se. A gate electrode 34 is used as a transfer gate electrode between storage gate electrode 33 and an n+ floating diffusion, which floating diffusion connects to the gate electrode of the insulated gate field effect transistor 32 used as an electrometer. The charge transfer channel defined by channel stop 31 narrows, or converges under transfer gate electrode 34, going from a broad portion under storage gate electrode 33 to a narrow portion in which the floating diffusion 35 is located. This narrowing increases the voltage sensitivity of the electrometer formed by floating diffusion 35 and FET 32.

FET 32 has its drain and source electrodes connected to receive operating voltages OD and OS, respectively, at least one of which connections is through a load impedance (not shown) across which an output voltage is taken. Periodically, normally during each field retrace interval, floating diffusion 35 is clamped to the reset drain potential RD applied to an n+ reset drain diffusion 36. This clamping is done by field effect transistor action between floating diffusion 35 (as a virtual source) and reset drain 36, responsive to a positive-going reset pulse signal $\phi_R$ applied to a reset gate electrode 37 during field retrace interval. The equivalent field transfer device with floating diffusion 35 as source, reset gate electrode 37 as gate, and reset drain 36 as drain is operated as a cascade, with a dc-biased gate electrode 38 interposed between floating diffusion 35 and reset gate 37 to forestall reset pulses inducing charge on floating diffusion 35.

The voltages $G_1$ and $G_2$ applied to gate electrodes 33 and 34 are of particular interest in defining various modes of operating the dark sensor and will be described in detail with respect to FIGS. 4, 5 and 6.

Figure 4:
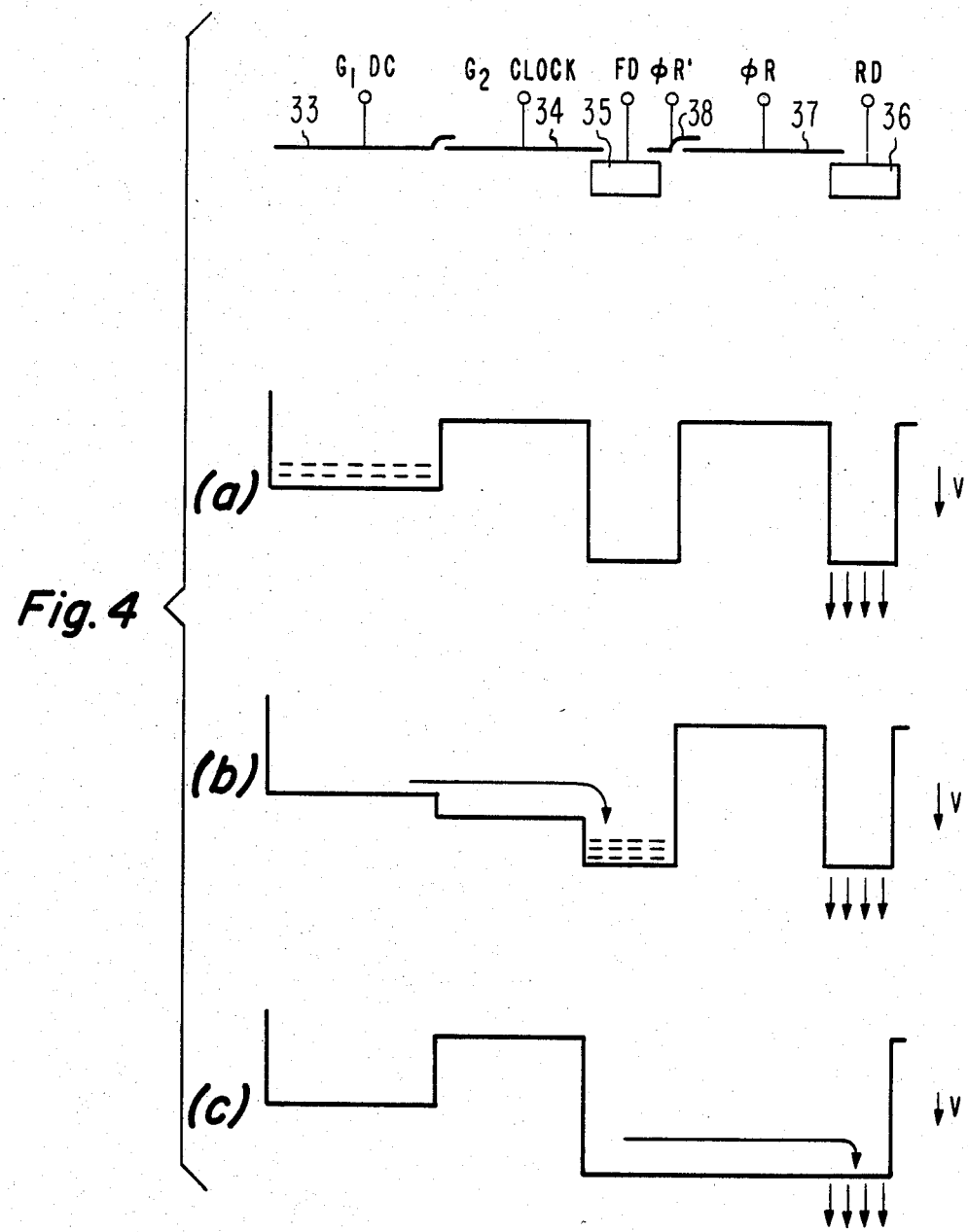
FIGS. 4, 5 and 6 are each a set of in-channel charge profiles descriptive of a respective different mode of operating the dark current sensor.

FIG. 4 is a set of in-channel potential energy profiles that show the operation of the dark sensor as an ultra-short charge-coupled-device shift register. As shown in profile (a) of FIG. 4, during field scan dark current charge accumulates in the storage well induced under gate electrode 33, and the floating diffusion 35 is at a voltage level established during the last field retrace. Just prior to field trace as shown in profile (b) of FIG. 4 the $\phi_R$ as applied to reset gate 37 clamps the floating diffusion 35 to the drain diffusion 36. As shown in profile (c) of FIG. 4, during field retrace $G_2$ is increased in potential to remove the barrier between the storage well, induced under gate electrode 33, and the floating diffusion 35. This allows the accumulated dark current to flow to floating diffusion 35 and lower the potential it applies to the gate electrode of electrometer FET 32 from the value established by reset clamp. This new dark current sample is held through the next field trace interval.

Figure 5:
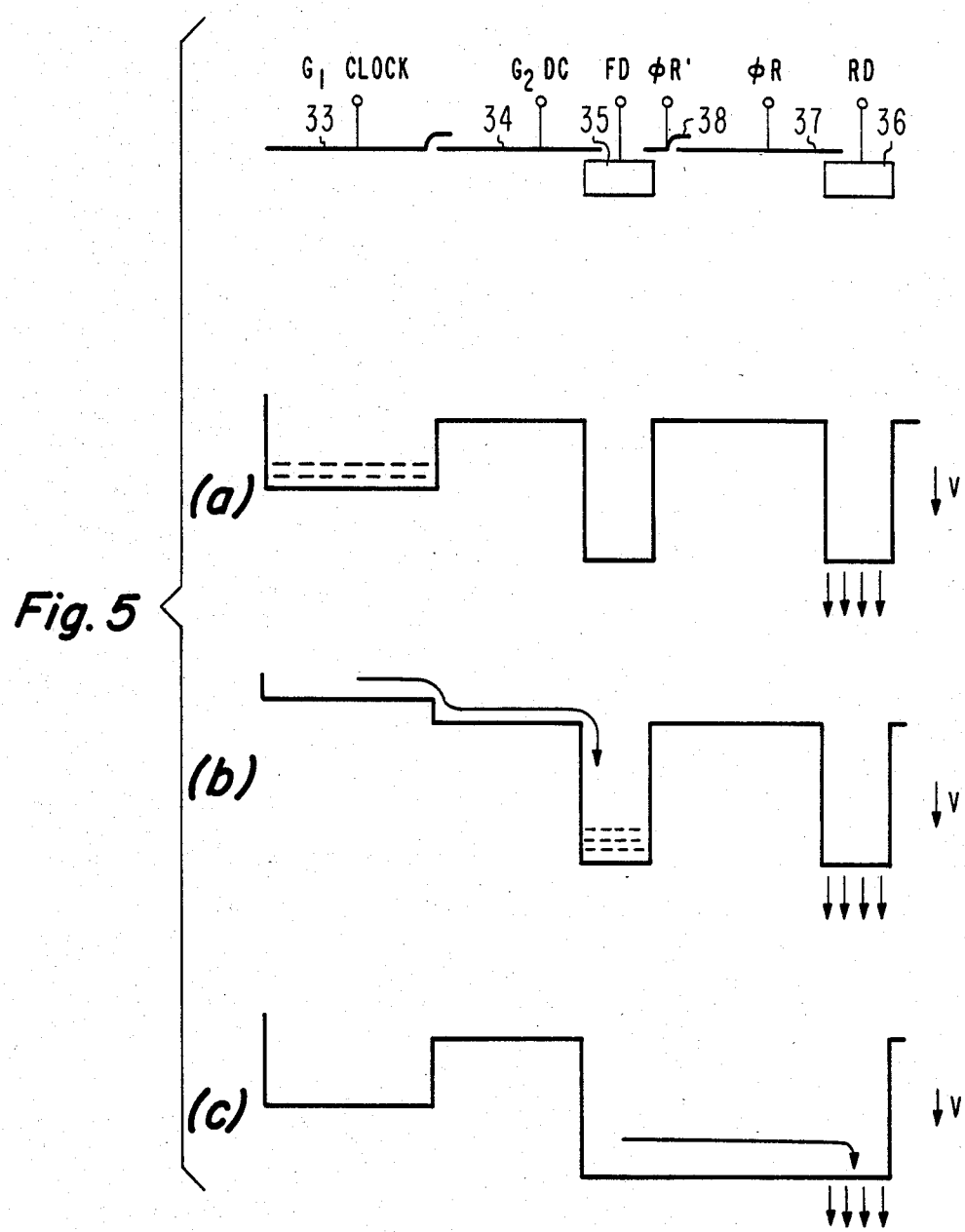

FIG. 5 shows an alternative fill-and-spill mode of operation for the dark current sensor wherein transfer gate electrode 34 receives a static bias potential and storage gate electrode 33 potential is periodically pulsed to transfer charge to floating diffusion 35. In-channel potential energy profiles (a) and (b) of FIG. 5 are similar to profiles (a) and (b) of FIG. 4 taken at corresponding times. Profile (c) of FIG. 5 shows the transfer of charge during field retrace being accomplished by pulsing the storage gate electrode 33 negative enough that accumulated dark current flows over the barrier induced under transfer gate electrode 34. The charge flows to floating diffusion 35 to lower the potential it applies to the gate electrode FET 32 from the value previously established by reset clamp. This new dark current sample is held through the next field trace interval.

Operation per FIG. 4 or 5 is not entirely satisfactory because it increases the pin-out of the semiconductor die on which the CCD imager and dark current sensor are located. Additional connections have to be provided for the $\phi_R$ reset pulses and for the dynamic clocking of transfer gate electrode 34 or storage gate electrode 33, it being possible to develop static bias voltages for gate electrodes 33 and 37 on the die. The pin-out problem is still greater where operation combines FIG. 4 and FIG. 5 operation to pulse gate electrode 34 move position at the same time gate electrode 33 is pulsed more negative during charge transfer to floating diffusion 35.

Figure 6:
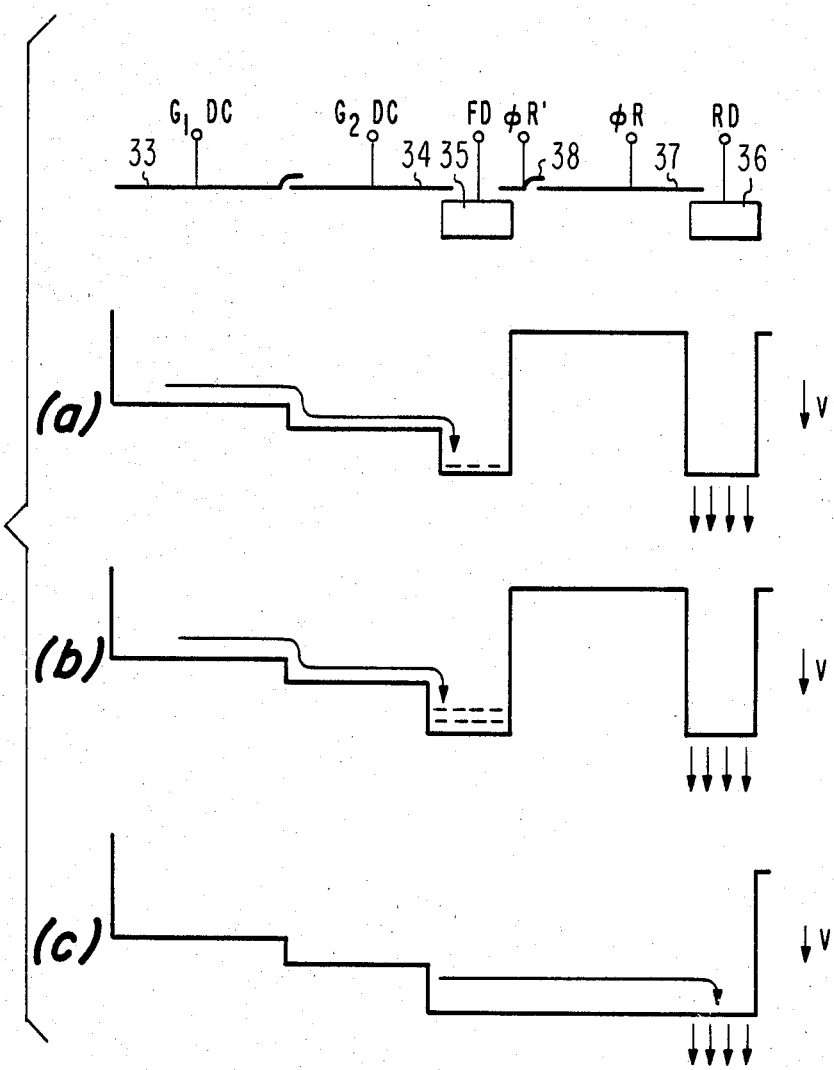

FIG. 6 shows gate electrodes 33 and 34 being statically biased at all times with accumulated dark current in excess of that which can be held in the storage well under gate electrode 33 spilling over to fill the well established under floating diffusion 35 during reset in the field retrace period. Profile (a) of FIG. 6 shows the accumulation of charge spilled from the well, under storage gate electrode 33 in the well under floating diffusion 35 midway through field trace. Profile (b) of FIG. 6 shows the floating diffusion 35 late in field trace. Profile (c) of FIG. 6 shows the reset to drain potential. The integration of spilled-over dark current charge under the floating diffusion 35 leads to a dark current ramp through field scan that can be differentially combined with the (presumably field-transfer-type) CCD imager of the output samples to cancel the dark current increase through field in them caused by dark current integration in the B register. One can also sample and hold a later portion of the ramp to provide a dark current reference for use in the following field.

The static biasing of gate electrodes 33 and 34 reduces the pin-out problem. D. F. Battson, a co-worker of the inventor, points out that in certain CCD imagers the resetting of the floating diffusion 35 can be carried out by applying an appropriate A register clocking phase to reset gate electrode 37. The selected phase applied to reset gate 37 must always be low or negative during field trace sufficient to prevent conduction between floating diffusion 35 and reset drain 36. Since the A register clocking of a field transfer type imager takes place only during field transfer in the field retrace interval, reset gate electrode 37 will receive a plurality of reset pulses all in the field retrace interval. This allows the accumulation of spilled-over dark current under floating diffusion 35 through field trace.

Figure 7:
FIG. 7 is a block diagram of a dark-current field shading compensator useful in certain embodiments of the invention.

FIG. 7 shows how a subtractor 40 can be connected for use as the dark-current field shading compensator 18 of FIG. 1, when the dark current sensing apparatus is operated as described in connection with FIG. 6.

Variants of FIG. 6 operation are possible in dark current sensors where transfer gate electrode 34 is dispensed with, and the storage well induced under storage gate electrode 33 empties directly to floating diffusion 35. Variants are also possible where a succession of more than two progressively more positively biased gate electrodes precede floating diffusion 35 to empty dark current beneath floating diffusion 35 throughout each successive field scan, to generate a dark-current ramp.

What is claimed is:

1. A dark current sensor included on the same semiconductor substrate as a CCD imager, wherein said CCD imager has charge transfer channels crossed by gate electrodes, charge storage wells of given charge storage capacities being at times electrostatically induced in said charge transfer channels beneath said gate electrodes, responsive to voltages applied to those gate electrodes, and wherein said dark current sensor comprises:
   a charge storage well for accumulating dark current charge;
   means for periodically emptying said charge storage well for accumulating dark current charge; and
   means for sensing the accumulated dark current charge emptied from said charge storage well for accumulating dark current charge after each emptying.

2. A dark current sensor included on the same semiconductor substrate as a CCD imager, wherein said CCD imager has charge transfer channels crossed by gate electrodes, charge storage wells of given charge storage capacities being at times electrostatically induced in said charge transfer channels beneath said gate electrodes in said charge transfer channels beneath said gate electrodes, responsive to voltages applied to those gate electrodes, and wherein said dark current sensor comprises:
   a floating-element electrometer, the floating element of which is reset periodically; and
   a potential energy well induced in said semiconductor substrate and biased respective to the potential to which said floating element is reset to condition said well to continually empty dark current charge under said floating element.

3. A dark current sensor as set forth in claim 2 wherein said floating-element electrometer is reset during each field retrace time.

4. A CCD imager and dark current sensor included on the same semiconductor substrate as set forth in claim 3, which said CCD imager is of field transfer type, in combination with means for differentially combining output voltages from said CCD imager and said dark current sensor to supply a video output signal with suppressed dark current field shading.

5. A dark current sensor included on the same semiconductor substate as a solid state imager, wherein said solid state imager accumulates quantities of charge descriptive of the intensities of the elements of a radiant energy image accompanied by dark current charges, and wherein said dark current sensor comprises:
   a charge storage well for accumulating dark current charge;
   means for periodically emptying said charge storage well for accumulating dark current charge; and
   means for sensing the accumulated dark current charge emptied from said charge storage well for accumulating dark current charge after each emptying.

6. A dark current sensor included on the same semiconductor substrate as a solid state imager, wherein said solid state imager accumulates quantities of charge descriptive of the intensities of the elements of a radiant energy image accompanied by dark current charges, and wherein said dark current sensor comprises:

a floating-element electrometer, the floating element of which is reset periodically; and a potential energy well induced in said semiconductor substrate and biased respective to the potential to which said floating element is reset to condition said well to continually empty dark current charge under said floating element.

7. A dark current sensor as set forth in claim 6 wherein said floating-element electrometer is reset during each field retrace time.

* * * * *